United States Patent
Takahashi et al.

(10) Patent No.: US 7,143,856 B2
(45) Date of Patent: Dec. 5, 2006

(54) APPARATUS FOR A VEHICLE FOR PROTECTION OF A COLLIDING OBJECT

(75) Inventors: Akio Takahashi, Wako (JP); Nobuyoshi Asanuma, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 389 days.

(21) Appl. No.: 10/791,038

(22) Filed: Mar. 1, 2004

(65) Prior Publication Data
US 2004/0182629 A1    Sep. 23, 2004

(30) Foreign Application Priority Data
Mar. 20, 2003    (JP)    ............... 2003-076948

(51) Int. Cl.
*B60R 21/34*    (2006.01)

(52) U.S. Cl. .................. 180/274; 180/271; 280/735; 701/45; 340/435; 340/436; 340/461; 348/148

(58) Field of Classification Search ............... 348/148; 180/274, 271; 701/45; 280/735, 730.1; 340/461, 435, 436
See application file for complete search history.

(56) References Cited

U.S. PATENT DOCUMENTS

| | | | |
|---|---|---|---|
| 5,732,785 A * | 3/1998 | Ran et al. ............... 180/271 |
| 6,281,806 B1 * | 8/2001 | Smith et al. ............. 340/901 |
| 6,327,536 B1 * | 12/2001 | Tsuji et al. .............. 701/301 |
| 6,408,237 B1 * | 6/2002 | Cho ....................... 701/45 |
| 6,535,242 B1 * | 3/2003 | Strumolo et al. ........ 348/148 |
| 6,757,611 B1 * | 6/2004 | Rao et al. ................ 701/301 |
| 6,873,911 B1 * | 3/2005 | Nishira et al. ........... 701/301 |
| 6,920,954 B1 * | 7/2005 | Hashimoto et al. ...... 180/274 |
| 6,950,014 B1 * | 9/2005 | Rao et al. ................ 340/438 |
| 2003/0112132 A1 * | 6/2003 | Trajkovic et al. ........ 340/435 |
| 2003/0128133 A1 * | 7/2003 | Thomas et al. .......... 340/854.9 |
| 2003/0149530 A1 * | 8/2003 | Stopczynski ............. 701/301 |
| 2003/0154011 A1 * | 8/2003 | Rao et al. ................ 701/45 |
| 2003/0179084 A1 * | 9/2003 | Skrbina et al. .......... 340/435 |
| 2004/0032493 A1 * | 2/2004 | Franke et al. ........... 348/148 |

FOREIGN PATENT DOCUMENTS

| JP | 7-125605 | 5/1995 |
|---|---|---|
| JP | 8-183422 | 7/1996 |

\* cited by examiner

*Primary Examiner*—Ruth Ilan
(74) *Attorney, Agent, or Firm*—Hamre, Schumann, Mueller & Larson, PC

(57) ABSTRACT

An apparatus for a vehicle for protection of a colliding object is provided, which includes one of a collision prediction module that delivers a precautionary signal when the collision prediction module predicts a collision of the vehicle with the object and a collision detection module that delivers a collision signal when the collision detection module detects the collision, an air bag which deploys on either a hood of the vehicle or an outside of its windshield when the collision is either predicted by the collision prediction module or detected by the collision detection module, a camera for taking a forward image of the vehicle and a monitor disposed in a cabin of the vehicle. In the apparatus, the monitor displays the image taken by the camera when the monitor receives one of the precautionary signal and the collision signal.

11 Claims, 9 Drawing Sheets

APPARATUS FOR A VEHICLE FOR PROTECTION OF A COLLIDING OBJECT

BACKGROUND OF THE INVENTION

The present invention relates to an apparatus for a vehicle for protection of a colliding object such as a pedestrian, which absorbs impulsive force acting on the object when the vehicle collides with it, and more particularly, it relates to an apparatus which is able to provide view for a driver when an air bag deploys on either the hood of a vehicle or the outside of its windshield during the collision with an object.

A hood air bag apparatus, which deploys an air bag on the hood of a vehicle when a sensor detects a collision with a pedestrian, is disclosed as a conventional apparatus for a vehicle for protection of a colliding object. For example, Japanese Published Patent Applications 7-125605 and 8-183422 report related arts.

The air bag is disposed in a folded configuration on the relatively forward portion of the hood so that it can deploy from the forward portion to a windshield. The air bag which deploys all over the hood protects the pedestrian from the second collision with the hood when he collides with the vehicle. The air bag, which has a thinner middle portion and a thicker backward distal portion as well as both thicker laterally distal portions, is able to serve as an effective absorber when it is deployed.

There is also a collision absorber apparatus of hood-elevated type, which springs the hood of a vehicle open so that it can serve as a cushion for protection of a colliding pedestrian. In this connection, the hood is elevated about 100 mm when a collision between the vehicle and pedestrian is detected by the sensor.

The hood air bag apparatus disclosed in Japanese Published Patent Application 8-183422, in which the thickness of an air bag is about 100 to 200 mm when it is deployed, is not able to sufficiently absorb the impulsive force acting on the pedestrian.

On the other hand, the collision absorber apparatus of hood-elevated type, whose elevated distance at the backward distal portion of hood is about 100 mm, is not able to provide a sufficient cushion to absorb the impulsive force.

These conventional techniques have a common problem that they cannot provide sufficient absorber effect during medium to high speed traveling of a vehicle because they are short of performance in terms of cushion. In order to overcome this problem, it may be one possible solution to increase the size of the air bag and the elevated distance of the hood. However, because each modification leads to an increase in the size of the apparatus, it may be difficult to adopt it, taking into account an ever-growing component density in an engine room.

There is also another problem that if the size of air bag or the elevated distance is increased, the view of a driver is blocked because the air bag or the hood confronts the windshield.

Under these circumstances, an apparatus for a vehicle for protection of a colliding object is demanded, which is able not only to absorb impulsive force acting on the object such as a pedestrian but also to securely provide view for a driver when a collision occurs.

SUMMARY OF THE INVENTION

According to an aspect of the present invention, there is provided an apparatus for a vehicle for protection of a colliding object, which includes one of a collision prediction module that delivers a precautionary signal when the collision prediction module predicts a collision of the vehicle with the object and a collision detection module that delivers a collision signal when the collision detection module detects the collision, an air bag which deploys on either a hood of the vehicle or an outside of its windshield when the collision is either predicted by the collision prediction module or detected by the collision detection module, a camera for taking a forward image of the vehicle and a monitor disposed in a cabin of the vehicle. In the apparatus, the monitor displays the image taken by the camera when the monitor receives one of the precautionary signal and the collision signal.

The apparatus of the present invention described above deploys the air bag on either the hood of the vehicle or the outside of the windshield when it predicts or detects the collision. The apparatus simultaneously takes the forward image of the vehicle and automatically displays it on the monitor disposed in the cabin. In this way, even if the deployed air bag occupies the windshield and blocks the view of a driver, the monitor on which the forward image of the vehicle is displayed can provide the virtual forward view for the driver. This removes restrictions from the size of air bag, thereby enabling an arbitrary increase in the size, so that the performance of air bag in terms of cushion is enhanced. Therefore, the apparatus, which employs the air bag for absorbing the impulsive force acting on the colliding object, can serve as an effective protector.

According to another aspect of the present invention, there is provided an apparatus for a vehicle for protection of a colliding object, in which a monitor comprises a head-up display unit which projects an image taken by a camera on a windshield.

The apparatus described above, which employs the head-up display unit serving as a monitor, can automatically project a forward image of vehicle taken by the camera on the windshield in front of a driver. In this way, the apparatus can provide the driver with the forward view, not changing the line of sight of the driver, when a collision between the vehicle and a pedestrian occurs.

BRIEF DESCRIPTION OF THE DRAWINGS

FIG. 6A is a schematic diagram illustrating a situation where a pedestrian sensor detects a pedestrian; FIG. 6B where an air bag is deployed; FIG. 6C where a pedestrian falls flat on an air bag.

DESCRIPTION OF THE PREFERRED EMBODIMENTS

Embodiments of the present invention are now described with reference to the accompanying drawings, assuming an exemplary case where a pedestrian is selected as a colliding object.

In the following description, "forward" is meant to represent a direction of vehicular traveling, "backward" the opposite direction, "upward" a direction of vehicular vertical line drawn upwardly and "downward" the opposite direction.

Also in description for embodiments, a common numeral is given to the same items and the description would not be repeated for them.

a. First Embodiment

An apparatus for a vehicle for protection of a colliding object according to a first embodiment is described referring to FIGS. 1 through 6C.

Figure 1:
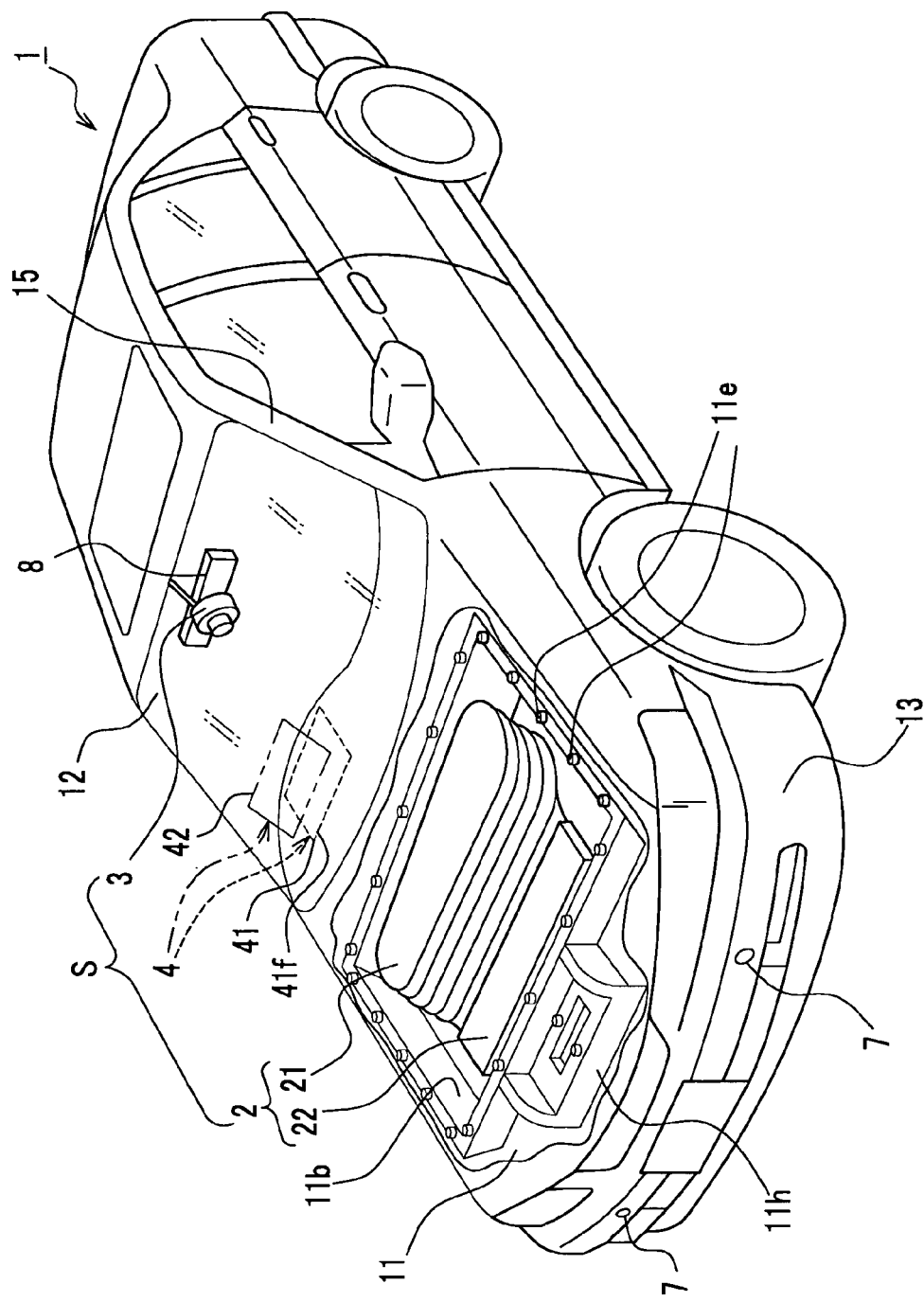
FIG. 1 is a perspective view showing an apparatus for a vehicle for protection of a colliding object according to the present invention when an air bag is not deployed.

As shown in FIG. 1, an apparatus S for a vehicle for protection of a colliding object (hereinafter referred to as "apparatus S") includes a pedestrian sensor 7, an air bag unit 2, a camera 3 for taking a forward image of a vehicle and a monitor 4. The pedestrian sensor 7 predicts the potential for a collision by detecting a distance L between a vehicle body 1 and a pedestrian H and the velocity of vehicle 1. Receiving a precautionary signal from the pedestrian sensor 7, the air bag unit 2 deploys an air bag 21. Similarly, receiving the precautionary signal from the pedestrian sensor 7, the monitor 4 displays the image taken by the camera 3. The apparatus S deploys the air bag 21 on either a hood 11 of the vehicle or the outside of a windshield 12 when the pedestrian sensor 7 predicts the potential for the collision as shown in FIGS. 6A through 6C, so that the apparatus S provides protection for the pedestrian H.

In this connection, the pedestrian sensor 7 refers to a collision prediction module in the appended claims. It may be possible to select other types of sensor or an infrared camera for the collision prediction module instead of the pedestrian sensor 7. The pedestrian H is an example of a colliding object described in the appended claims.

The pedestrian sensor 7, including a sensor which is able to receive and transmit an ultrasonic wave signal, a radio wave signal or a laser beam signal, is installed in a hole drilled into a bumper 13 mounted to the forward portion of the vehicle body 1.

Figure 6A:
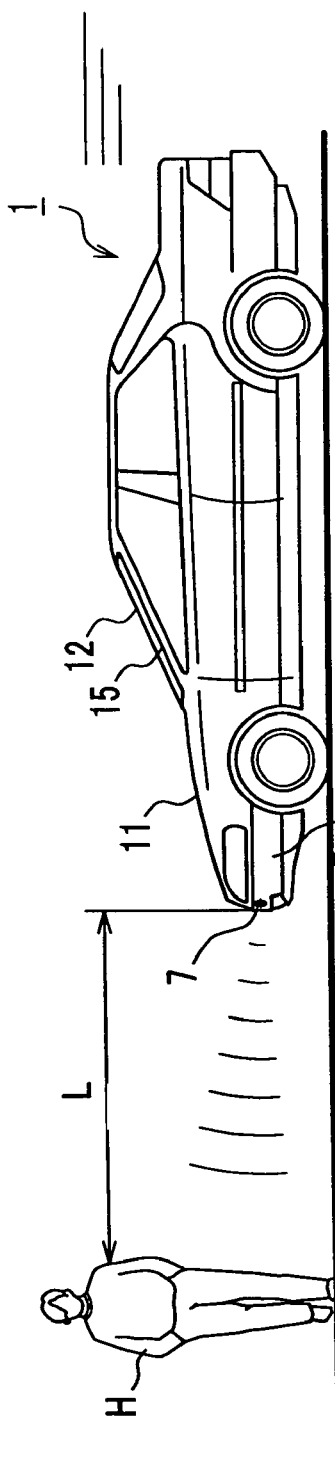
FIGS. 6A to 6C are diagrams showing an apparatus according to the present invention.
Figure 6B:
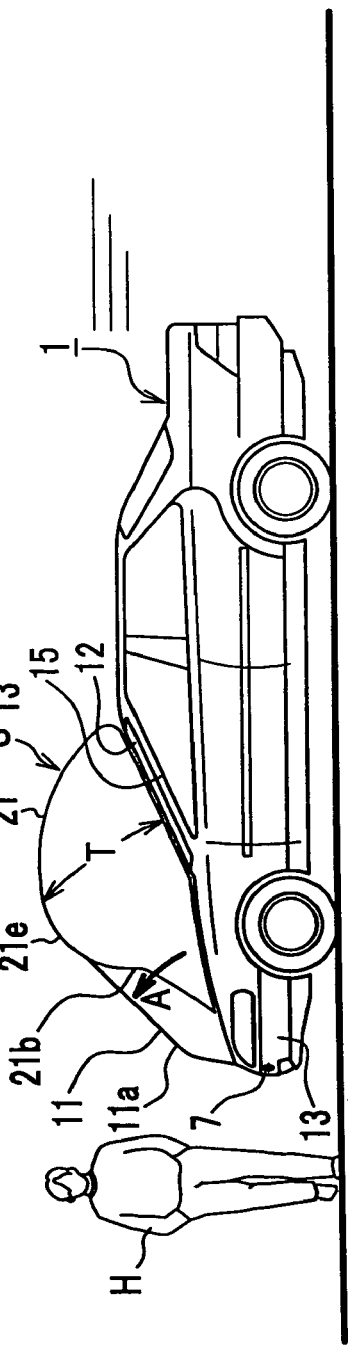
Figure 6C:
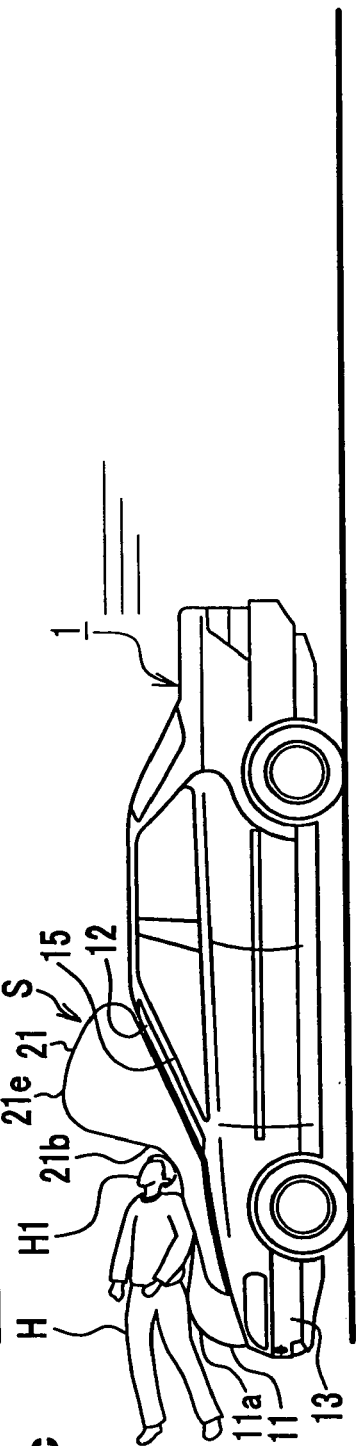

As shown in FIGS. 6A through 6C, the pedestrian sensor 7 transmits a signal, for example an ultrasonic wave signal, and detects a signal reflected by the pedestrian H, so that the pedestrian sensor, 7 measures the distance L between the forward end of vehicle body 1 and the pedestrian H. The pedestrian sensor 7 judges if the vehicle is going to collide with the pedestrian H according to the distance L and the vehicle velocity. When the pedestrian sensor 7 predicts an imminent collision, it sends a precautionary signal to an inflator 22 shown in FIG. 2, to which the pedestrian sensor 7 is electrically connected.

The apparatus S can give protection for any colliding object such as an animal or a stationary object instead of the pedestrian H.

The vehicle and the vehicle body 1 are described in detail referring to FIGS. 1 through 5.

Figure 2:
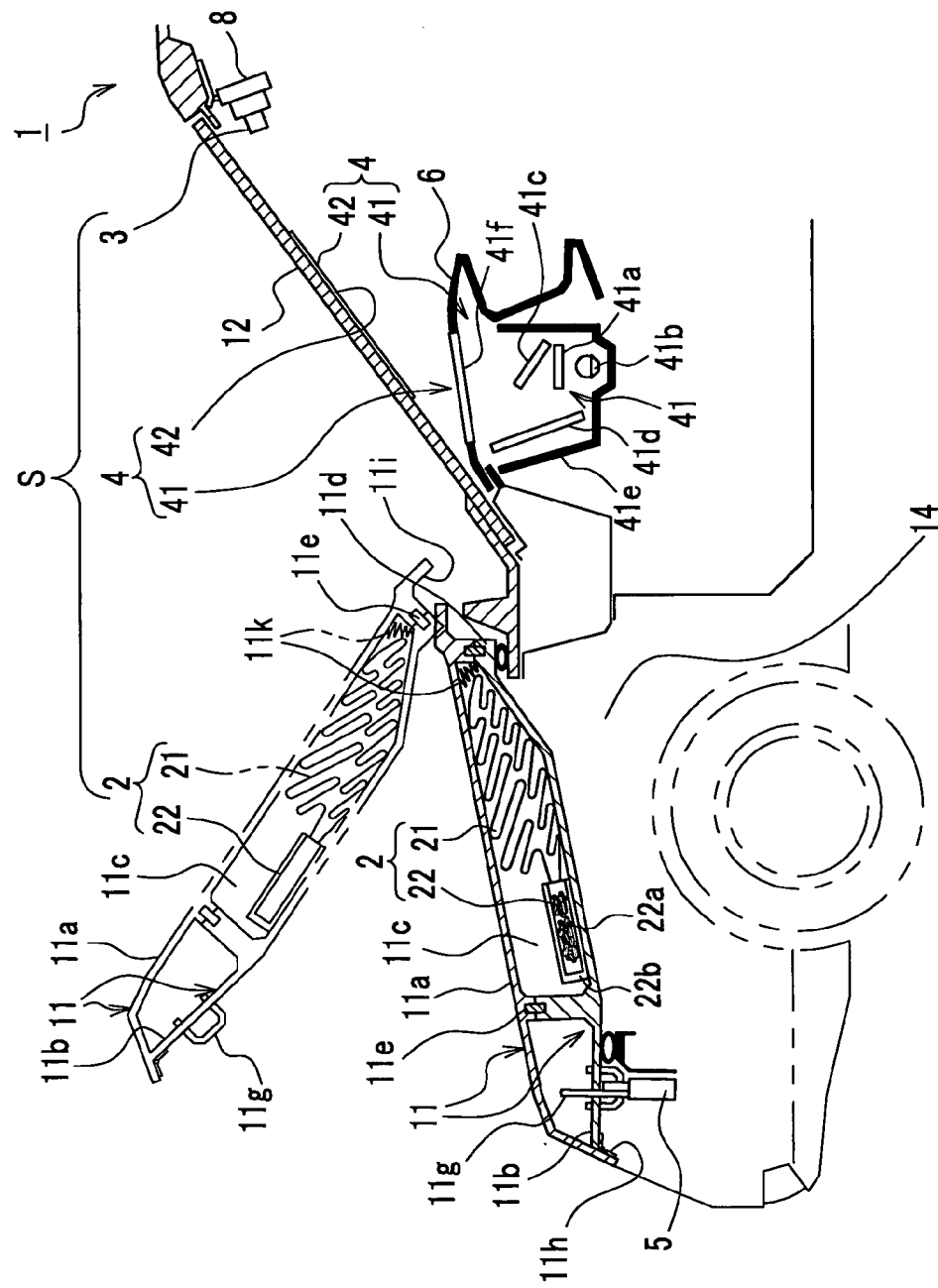
FIG. 2 is an enlarged sectional view showing major components of an apparatus according to the present invention.

The vehicle includes any type of vehicle such as a passenger car or a work vehicle as long as it has a hood 11 covering an engine room 14 or a trunk room (not shown), which lies in the forward portion of the vehicle body 1 shown in FIG. 2. The passenger car is selected to exemplarily describe the present invention.

The bumper 13 is made of a soft resin excelling as an absorber for impulsive force, such as ethylene propylene rubber or ethylene propylene diene rubber, which has long been used for the bumper of a vehicle. The bumper 13 is disposed laterally over the forward portion of the vehicle 1 with a predetermined height in a vertical direction. As shown in FIGS. 6A and 6B, the bumper 13 is, for example, adapted to stand substantially the knee height of an adult. The hood 11 for covering the engine room 14, which houses a radiator and an engine (both not shown), is disposed over and behind the bumper 13.

As shown in FIG. 2, the hood 11 includes a hood skin 11a disposed outside the engine room 14 and a hood frame 11b which is attached to the inner side of the hood skin 11a facing the engine room 14. The hood 11, which includes the hood skin 11a and the hood frame 11b, forms an air bag storage space 11c having a relatively large width and small depth for storing the air bag unit 2. The hood 11 includes a hood hinge lid, around which the hood 11 pivots, opening or closing the engine room 14. A lock member 11g, which is disposed at a forward portion of the hood frame 11b, is engaged with a hood lock 5 attached to the vehicle body 1, so that the hood 11 is locked, securely closing the engine room 14.

The hood skin 11a and the hood frame 11b are made of sheets of glass fiber reinforced plastic or rolled metallic materials such as aluminum alloys.

Figure 3:
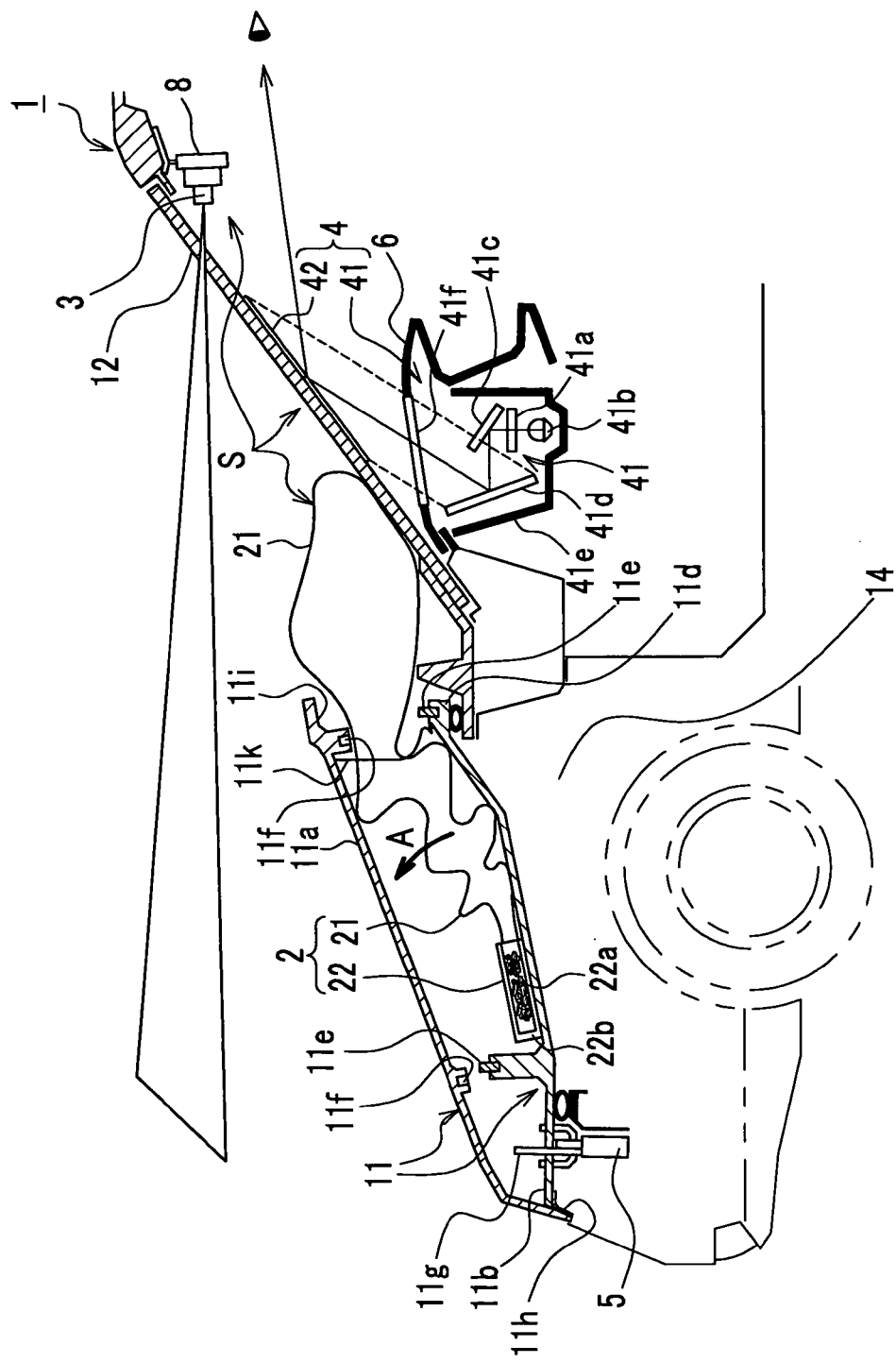
FIG. 3 is an enlarged sectional view showing major components of an apparatus according to the present invention when an air bag is deployed.

As shown in FIGS. 2 and 3, the hood skin 11a and the hood frame 11b are securely united to each other by a front hinge 11h disposed at the forward distal portion of the hood 11. A plurality of joint pins 11e, which project upwardly from the periphery and substantially middle of the hood frame 11b, are inserted into bosses 11f formed on the lower surface of the hood skin 11a, so that the hood skin 11a and the hood frame lib are united to each other. Normally, these hood skin 11a and hood frame lib are held on the vehicle body 1 in a united configuration.

Figure 5:
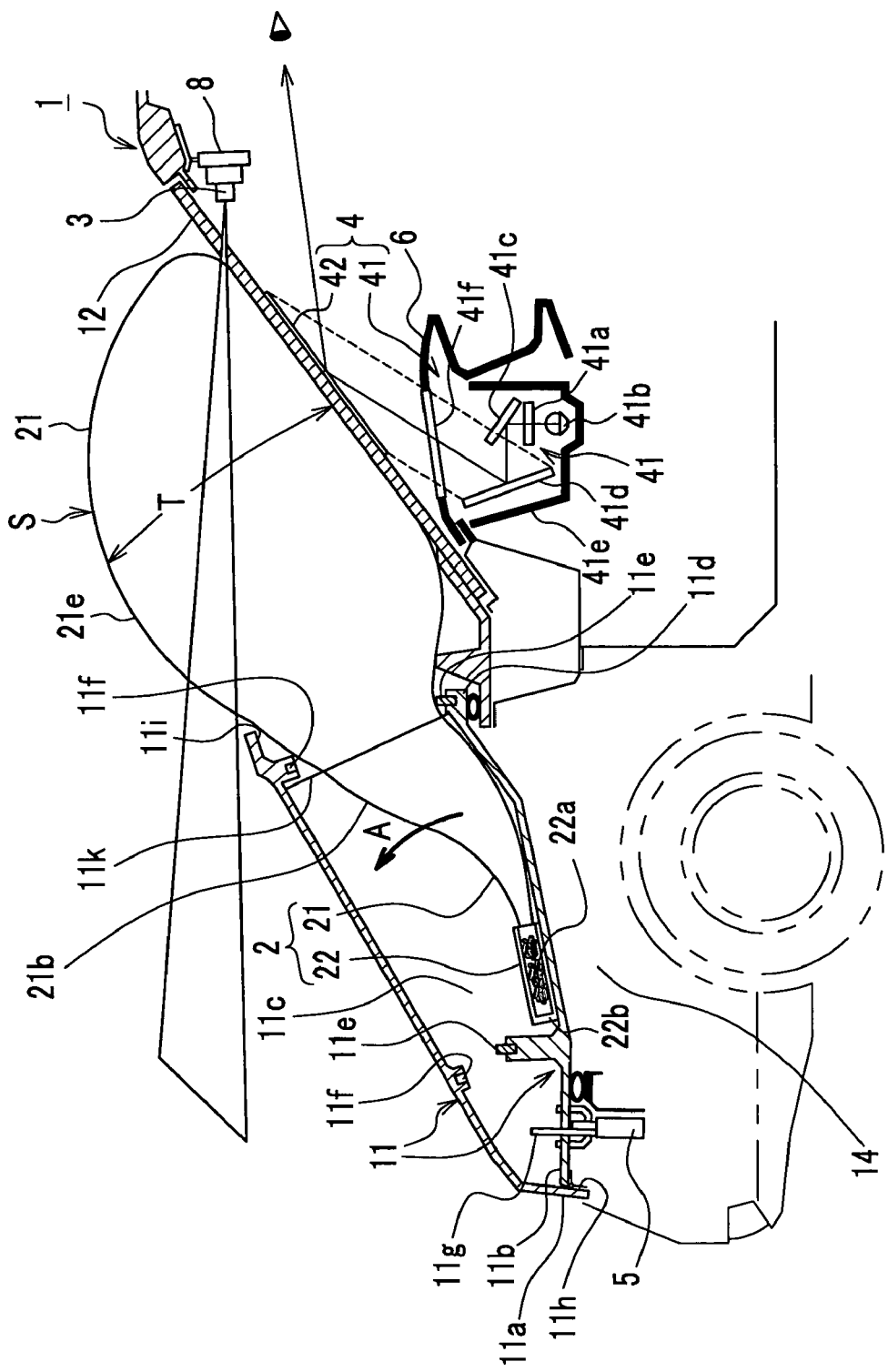
FIG. 5 is an enlarged sectional view showing major components of an apparatus according to the present invention when an air bag is deployed.

As shown in FIG. 5, when the air bag 21 deploys, the hood skin 11a pivots about the front hinge 11h as a result of the force exerted by the expansion of air bag 21, so that an opening 11i of the air bag storage space 11c is formed between the hood skin 11a and the hood frame 11b. A stopper 11k similar to a lope is disposed inside the opening 11i, which couples the hood skin 11a and the hood frame 11b so as to restrict an opening angle of the opening 11i.

The hood skin 11a is made of a flexible and elastic plate, which is able to change its shape when a load exceeding a predetermined value is applied to it, so that the hood skin 11a softly receives the pedestrian H at a collision as shown in FIG. 6C.

The forward right and left distal portions of the hood frame 11b are securely connected to the hood skin 11a through the front hinge 11h. On the other hand, the backward right and left distal portions of the hood frame 11b are pivotally coupled to the vehicle body 1 through the hood hinge 11d.

A camera 3 is mounted to a room mirror 8 which is disposed near the upward distal portion of the inside surface of the windshield 12. A head-up display unit 41, which is mounted to an instrument panel 6, is located near the downward distal portion inside the windshield 12. A front window screen 42 of the monitor 4 is disposed in the middle of the inside surface of the windshield 12.

The air bag unit 2 includes the air bag 21 which lies folded in the air bag storage space 11c, and an inflator 22 for deploying the air bag 21 on the windshield 12.

Figure 4:
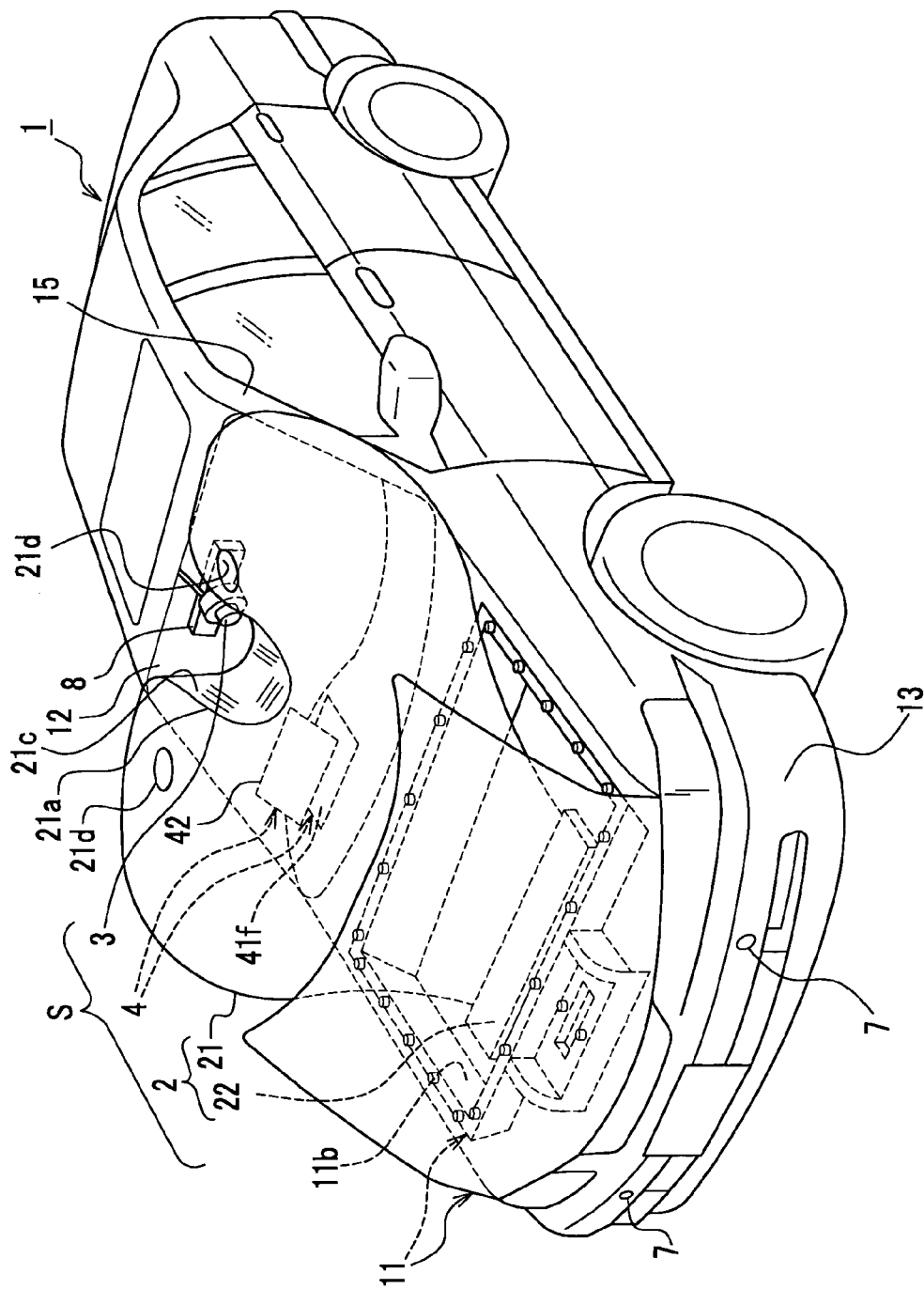
FIG. 4 is a perspective view showing an apparatus according to the present invention when an air bag is deployed.

As shown in FIG. 4, the air bag 21, which is deployed for protection of the pedestrian H colliding with the vehicle, has a vent hole 21d so that the air bag 21 can deflate after its deployment. The air bag 21 is stored folded laterally on the hood frame lib as shown in FIG. 1.

The air bag 21 is adapted not only to have an enough area to cover substantially all the windshield 12 and a front pillar 15 but also to have a thickness or an energy absorption stroke T which allows the air bag 21 to softly receive the colliding pedestrian H as shown in FIG. 6C.

The air bag 21 has a cutout 21a through which the camera 3 can take a forward image of the vehicle. A transparent membrane 21c such as a thin transparent resin sheet covers the cutout 21a. The transparent membrane 21c, which does not block the field of view of the camera 3, is also adapted to protect a head H1 of the pedestrian H.

As shown in FIG. 6B, the air bag 21 has a convex configuration as viewed laterally when it is deployed. As shown in FIG. 6C, the air bag 21 is adapted so that the contour from a top 21e to a foot 21b of the convex can meet the anticipated movement of the head H1 of colliding pedestrian H. In other words, the inflated air bag 21 is formed so that it provides a maximum of the energy absorption stroke T for the colliding head H1.

As shown in FIG. 5, the inflator 22 is a gas generator, which includes an igniter (not shown), a gas generating agent 22a such as sodium azide and a casing 22b that houses these components. Triggered by a precautionary signal sent by the pedestrian sensor 7, the igniter instantaneously burns the gas generating agent 22a so as to generate high-pressure nitrogen gas. In this way, the inflator 22 instantaneously inflates the air bag 21.

As shown in FIGS. 1 and 4, the inflator 22 is adapted to be wide enough to smoothly inflate the air bag 21 in a direction of vehicle width, taking into account the shape of air bag 21.

The camera 3, which is made of a small CCD camera for taking a forward image of the vehicle, is mounted to the forward surface of the room mirror 8. Receiving a signal from the pedestrian sensor 7 or triggered by the deployment of the air bag 21, this camera 3 provides a driver with a forward view even if he cannot look out through the windshield 12 which is blocked by the air bag 21 and the hood 11.

As shown in FIG. 5, on receiving a precautionary signal sent by the pedestrian sensor 7, the monitor 4, which is mounted to the instrument panel 6 and the like, automatically displays an image taken by the camera 3. This monitor 4, for example, projects the image on the front window screen 42, which is disposed on the inside surface of the windshield 12, with the head-up display unit 41.

The head-up unit 41 includes a liquid crystal display (LCD) device 41a, a light source 41b, a first reflector 41c, a second reflector 41d, a housing 41e and a transparent cover 41f. Description is given to each item below. The LCD device 41a displays a forward image of the vehicle. The light source 41b is disposed behind the LCD device 41a to project its displayed image. The first reflector 41c reflects the image projected by the light source 41b to the second reflector 41d. The second reflector 41d reflects the reflected image so as to project it onto the front window screen 42. The housing 41e accommodates these items 41a, 41b, 41c and 41d. The transparent cover 41f is fitted into the top of the housing 41e so that the image can pass through it.

A high brightness lamp such as a fluorescent or incandescent lamp is generally used for the light source 41b because the head-up unit 41 is often requested to be operable under light conditions in daytime.

The windshield 12 itself or a half-mirror bonded to the inner surface of the windshield 12 serves as the front window screen 42.

Next, description is given to how an apparatus according to the first embodiment operates.

As shown in FIG. 2, a hood skin 11a and a hood frame 11b are normally connected to each other with a joint pin 11e and a boss 11f. An air bag 21 is stored folded within an air bag storage space 11c. It is easy to increase the size of an air bag unit 2 because the air bag storage space 11c, which lies between the hood skin 11a and the hood frame 11b, has large volume. An engine room 14 is exposed if a hood 11 is pivoted as shown in FIG. 2 by unlocking a lock member 11g from a hood lock 5.

As shown in FIG. 6A, while a vehicle is normally traveling, an apparatus S monitors a pedestrian H by measuring a distance L between the forward end of a vehicle body 1 and the pedestrian H as well as a velocity of the vehicle using a pedestrian sensor 7, which is disposed at a forward portion of the vehicle body 1 and detects a signal reflected by the pedestrian H, such as an ultrasonic wave signal or a laser beam signal.

If the pedestrian sensor 7 judges that the vehicle is going to collide with the pedestrian H in one second according to the measured distance L of 22 meters while the vehicle is traveling at 80 Km/H, the pedestrian sensor 7 sends a precautionary signal to an air bag unit 2 and a head-up display unit 41 so as to activate them.

The precautionary signal is sent to an inflator 22 from the pedestrian sensor 7. Triggered by the precautionary signal, the inflator 22 starts its operation and ignites a gas producing agent 22a so as to generate a high-pressure gas, which is sent to the folded air bag 21 so that it can be instantaneously deployed.

The inflated air bag 21 exerts pressure on the hood skin 11a and the hood frame 11b. In this way, the hood skin 11a pivots about the front hinge 11h in a direction shown by an arrow A with the boss 11f separating from the joint pin 11e, so that the opening 11i is formed as shown in FIG. 3. The air bag 21 goes out through the opening 11i and deploys on the windshield 12. During this movement, the hood frame 11b holds the same position because it is mechanically connected to the vehicle body 1 by the hood hinge 11d. Therefore, the apparatus S does not require a conventional hood deployment mechanism because the inflated air bag 21 produces the pressure to induce the pivotal movement of the hood skin 11a.

As shown in FIG. 5, the air bag 21 further expands and pushes up the hood skin 11a, which a stopper 11k holds in a slope descending toward the front of the vehicle body 1 so that it can serve as support for the pedestrian H.

As shown in FIGS. 5 and 6B, the air bag 21 coming out through the opening 11i deploys in a convex shape, covering all the windshield 12 and a front pillar 15 before the pedestrian H collides with the vehicle. In this way, the air bag 21 can be prepared for supporting the pedestrian H, no matter how tall or short he is.

As shown in FIG. 6C, when the pedestrian H collides with a bumper 13, he is swept his legs by the bumper 13, thereby falling to the hood 11 and the air bag 21 with his head H1 first.

Receiving a load applied by the mass of pedestrian H, the hood skin 11a bends, so that it can absorb the impulsive force at a collision. The hood skin 11a, which is made of a light alloy or a resin, has light mass and small inertia. In addition, because the inflated air bag 21 lies under the hood skin 11a when the pedestrian H collides with the vehicle, the hood skin 11a softly moves backward relative to the vehicle body 1, therefore serving as an excellent absorber for the impulsive force at the collision.

The air bag 21 can softly support the upper body of pedestrian H mainly including the head H1 so as to absorb the impulsive force because the head H1 lies on the convex portion of the air bag 21 which has an energy absorption stroke of 1000 mm or more.

The apparatus S is able to provide protection for the pedestrian H with the hood skin 11a and the air bag 21 during medium to high speed running of the vehicle as well as low speed running.

In this way, the combination of the hood skin 11a and the air bag 21, which can efficiently absorb the impulsive force acting on the pedestrian H when he falls flat on the vehicle body 1, can decrease secondary damage.

In this connection, it may be possible that the air bag 21 does not cover a forward portion of the hood 11 where the hood skin 11a can instead serve as an absorber for the impulsive force. Therefore, the air bag 21 of the apparatus S, which is smaller than a conventional one that covers the complete area defined by the hood 11 and the windshield 12, can still provide the similar performance in terms of impulsive force absorber.

A head-up display unit 41 is described, which operates in parallel with the air bag unit 2.

A precautionary signal of the pedestrian sensor 7 is sent to a light source 41b. The image taken by the camera 3 is projected onto a front window screen 42 in front of a driver through an LCD device 41a, first and second reflectors 41c and 41d and a transparent cover 41f.

As shown in FIGS. 4 and 5, the elevated hood 11 blocks the forward view of the driver and so does the inflated air bag 21 which covers the windshield 12 and the front pillar 15.

As shown in FIG. 4, the deployed air bag 21 has a transparent membrane 21c covering a cutout 21a located in its middle and upper end portion, through which the camera 3 can take a forward image of the vehicle body 1. In this way, the driver can continue safely driving the vehicle in case the air bag unit 2 incorrectly operates and the forward view is completely blocked, because the forward image taken by the camera 3 is displayed on the front window screen 42.

Although the air bag 21 has the cutout 21a, it can prevent the head H1 from hitting the windshield 12 with the transparent membrane 21c covering the cutout 21a.

b. Second Embodiment

Figure 7:
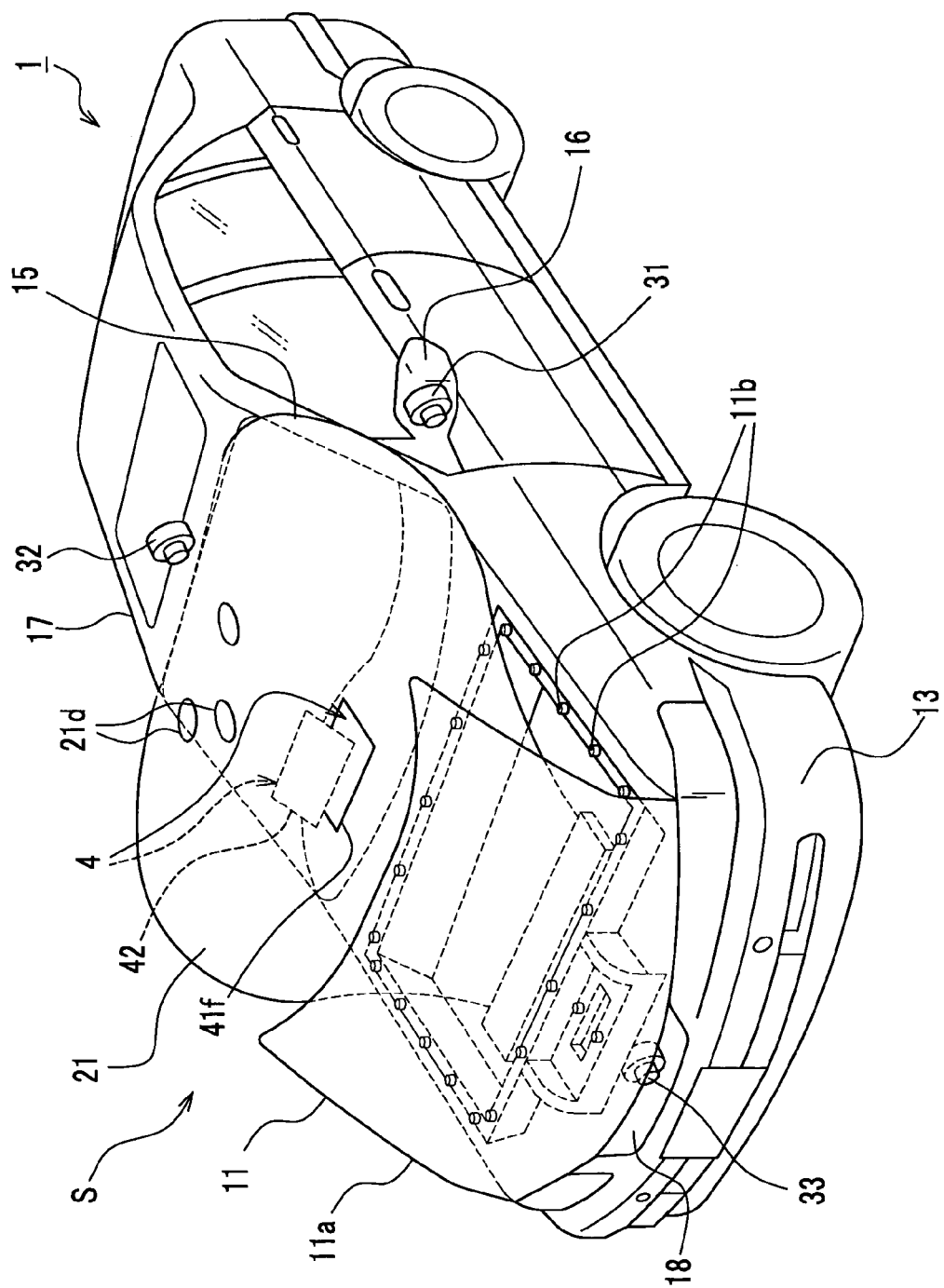
FIG. 7 is a perspective view showing the installation of cameras of an apparatus according to the present invention.

A second embodiment of the present invention is described referring to FIG. 7. FIG. 7 is a perspective view showing the installation of cameras according to the present invention.

In the second embodiment, cameras 3 according to the first embodiment are mounted to a side mirror 16 such as a door mirror or a fender mirror, a roof top 17 and a front grille 18.

A camera 31 is mounted to the forward surface of the side mirror 16 disposed on the right or left side of a vehicle body 1 so that it can take a forward image of a vehicle.

A camera 32 is mounted to the roof top 17 so that it can take a forward image of the vehicle.

A camera 33 is mounted to the front grille 18 disposed at the forward portion of an engine room (not shown) so that it can take a forward image of the vehicle.

The locations of cameras 31, 32 and 33 are selected so that they can always take the forward images even if the air bag 21 and the hood 11 operate and block the forward view of a driver. If infrared cameras are introduced, they can take clear forward images even in the nighttime.

c. Third Embodiment

Figure 8:
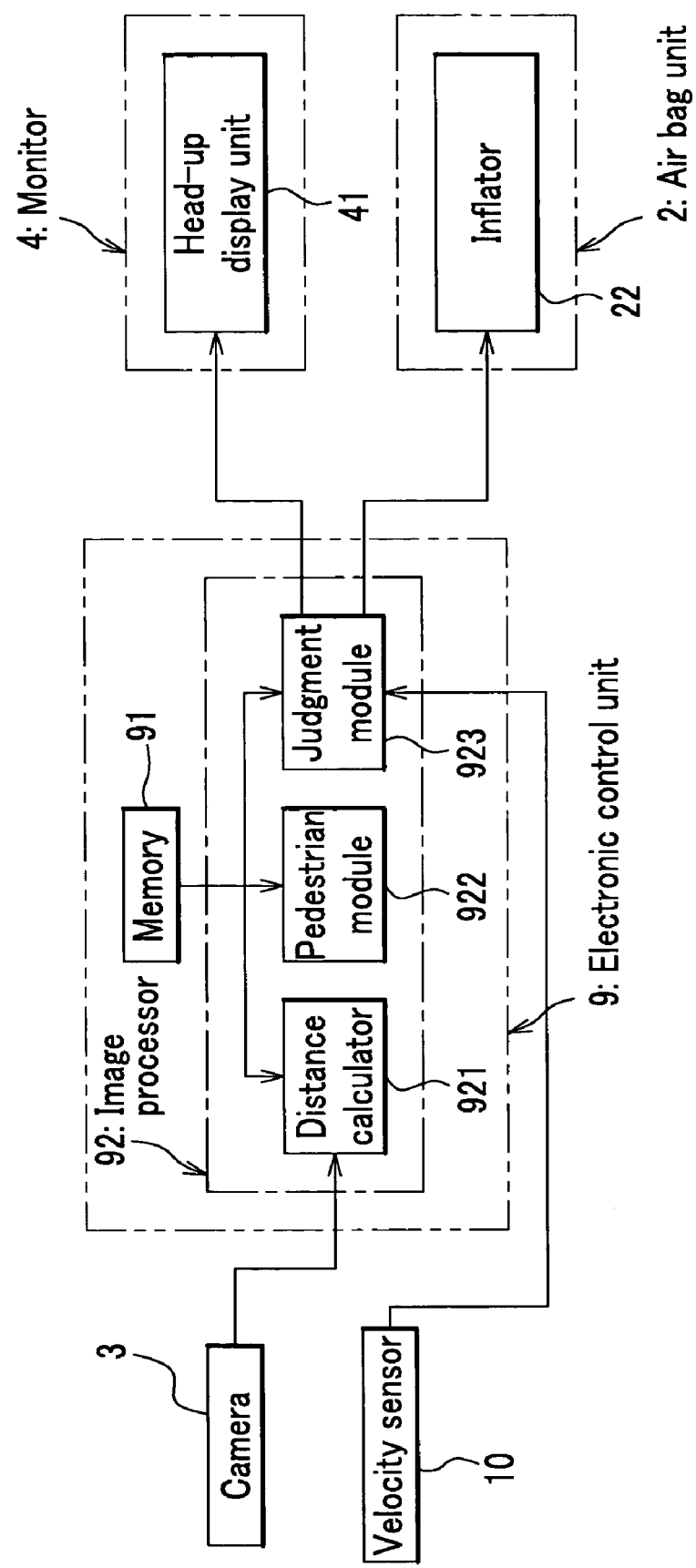
FIG. 8 is a block diagram illustrating an apparatus according to the present invention.
Figure 9:
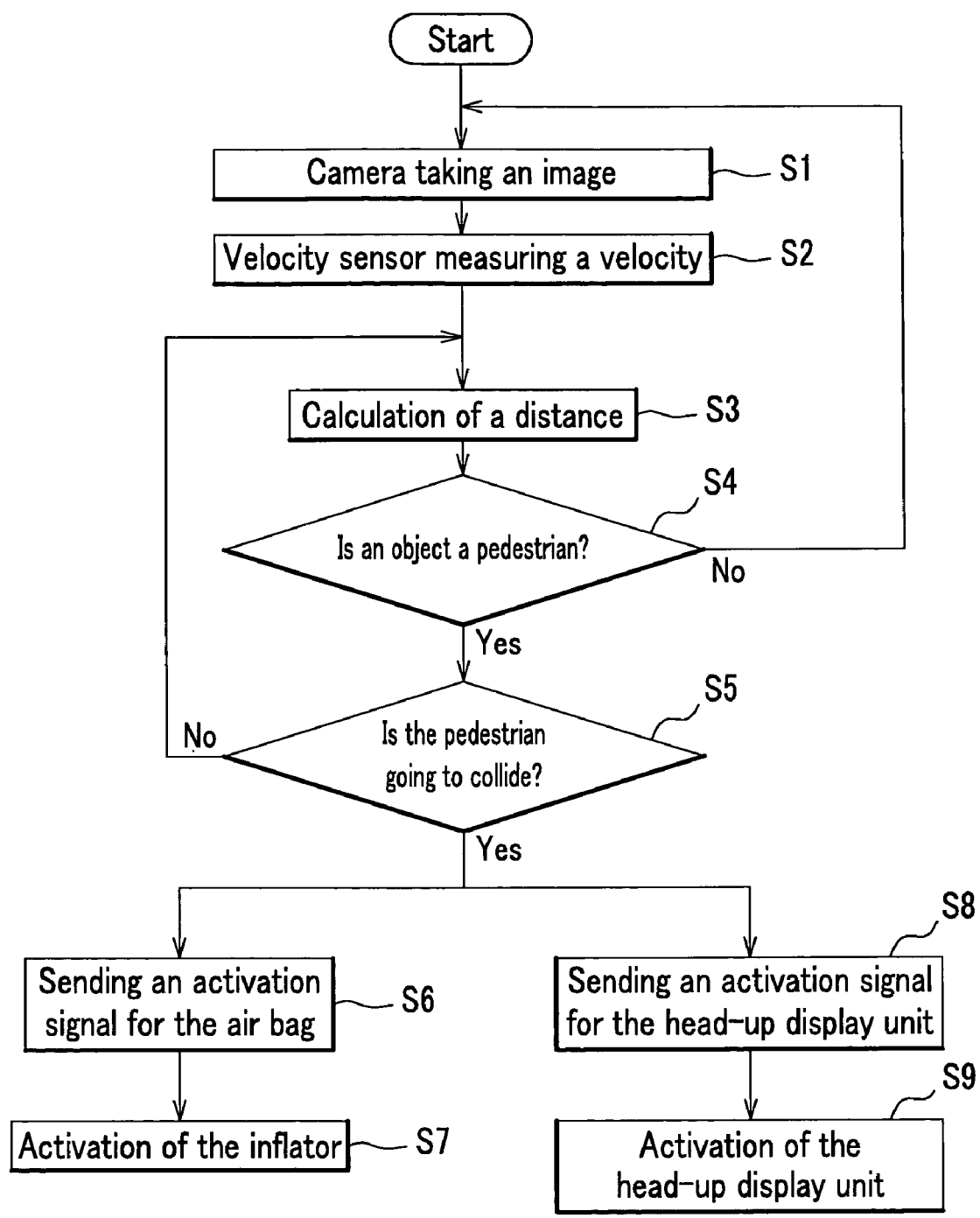
FIG. 9 is a flow chart detailing the steps for the operation of an apparatus according to the present invention.

A third embodiment of the present invention is described referring to FIGS. 8 and 9.

In the third embodiment, an apparatus S according to the first embodiment judges if a pedestrian H is going to collide with a vehicle according to a signal delivered by a camera 3 according to the first embodiment.

FIG. 8 is a block diagram showing an apparatus according to the present invention.

As shown in FIG. 8, the apparatus S includes the camera 3 to take a forward image of a vehicle, an electronic control unit 9, a velocity sensor 10, a monitor 4 including a head-up display unit 41 and an air bag unit 2 including an inflator 22.

The camera 3, which is the same as that of the first embodiment and the cameras 31, 32 and 33 of the second embodiment, is electrically connected to a distance calculator 921.

The electronic control unit 9, which is made of, for example a CPU, a ROM and a RAM, has a memory 91 and an image processor 92.

The memory 91 includes a pedestrian template, which stores in advance the height and volume or the shape of a pedestrian H that is correlated with a distance distribution relative to a vehicle body 1 and a vehicle velocity. This memory 91 is electrically connected to the distance calculator 921, a pedestrian module 922 and a judgment module 923, respectively.

Receiving image information sent by the camera 3, the image processor 92, which includes the distance calculator 921, the pedestrian module 922 and the judgment module 923, identifies the pedestrian H who is going to collide with the vehicle body 1.

The distance calculator 921 makes a comparison between the image information sent by the camera 3 and the image data stored in the memory 91, thereby calculating a distance L between the pedestrian H and the vehicle body 1. The distance calculator 921 is electrically connected to the pedestrian module 922.

The pedestrian module 922 makes a comparison between the image information sent by the camera 3 and the image data stored in the memory 91, so that it determines whether or not an object depicted by the image information is a pedestrian H. The pedestrian module 922 is electrically connected to the judgment module 923.

The judgment module 923 makes a judgment if the pedestrian H is going to collide with the vehicle according to the assessment of image information which results from the comparisons between the signals and the data that is stored in the memory 91. The signals include the image signal of a pedestrian identified by the pedestrian module 922, the distance signal between the pedestrian H and the vehicle body 1 calculated by the distance calculator 921 and the velocity signal sent by the velocity sensor 10. On the other hand, the data includes image data, distance data and vehicle velocity data. The judgment module 923 is electrically connected to the head-up display unit 41 of monitor 4 and the inflator 22 of air bag unit 2, respectively.

The velocity sensor 10, which is electrically connected to the judgment module 923, detects the rotation of wheel so as to generate the velocity of vehicle.

The operation of an apparatus according to the third embodiment of the present invention is described, mainly referring to FIGS. 8 and 9 as well as other drawings. FIG. 9 is a flow chart showing the steps for the operation of the apparatus.

Triggered by the activation of the camera 3, the apparatus S can start monitoring a pedestrian who is going to collide with a vehicle.

The camera 3 takes an image at a step S1. Subsequently, the velocity sensor 10 detects the rotational speed of a wheel so as to measure the velocity of a vehicle at a step S2.

Next at a step S3, the distance calculator 921 calculates the distance L from the vehicle body 1 to the pedestrian H based on the comparison between the image information obtained by the camera 3 at the step S1 and the image data stored in the memory 91, which includes the height and either the volume or the shape of the pedestrian H.

At a step S4, the pedestrian module 922 compares the image information of an object obtained by the camera 3 and the image data of a pedestrian H stored in the memory 91, so that it judges if the object happens to be the pedestrian H. If the module 922 determines that the object is the pedestrian H, the flow proceeds to a step S5. Otherwise, the flow returns to the step S1 and the steps S1 through S4 are repeated.

At the step S5, the judgment module 923 judges if the pedestrian H is going to collide with the vehicle body 1 by making a comparison between the data stored in the memory 91 and the signals, such as the vehicle velocity signal obtained by the velocity sensor 10 at the step S3 and the distance signal from the vehicle 1 to the pedestrian H obtained at the step S3. If the module 923 determines that there is going to be a collision, the flow simultaneously proceeds to both steps S6 and S8. The module 923 sends not only an activation signal to the inflator 22 at the step S6 but also the other activation signal (a precautionary signal) to the head-up display unit 41 at the step S8. On the other hand, if the module 923 judges otherwise, the flow returns to the step S3 and the steps S3 through S5 are repeated.

The inflator 22 shown in FIG. 5 ignites a gas generating agent 22a so as to produce a high-pressure gas at a step S7. The high-pressure gas, which flows into the folded air bag 21, instantaneously deploys it. This expansion force produced by the air bag 21 elevates and pivots the hood skin 11a. In this way, the hood skin 11a and the air bag 21, which are prepared for protection of the pedestrian H, receive him as shown in FIG. 6C.

At a step S9, receiving the activation signal or precautionary signal, the head-up display unit 41 projects the image taken by the camera 3 on the front window screen 42 with the light source 41b turned on. This provides a virtual forward view of the vehicle for a driver even if the air bag 21 and the hood 11 block a real view through the windshield 12. Accordingly, it may be possible to flexibly select the thickness and width of the air bag 21 so that its energy absorption stroke T can be increased.

While the invention has been described in detail and with reference to specific embodiments thereof, it will be apparent to one skilled in the art that various changes and modifications can be made therein without departing from the spirit and scope thereof. For example, it may be possible to adapt the apparatus to operate for all types of objects instead of only a pedestrian as described above. It may also be possible to adapt the apparatus to operate according to the relative approaching velocity between a vehicle and an object.

It may be possible that an apparatus S includes a collision detection module (not shown) which detects a collision with a pedestrian, an air bag unit 2 which activates the deployment of an air bag 21 according to a collision signal sent by the collision detection module, a camera 3 for taking a forward image of the vehicle and a monitor 4 for projecting the image taken by the camera 3 according to the collision signal. This apparatus S can protect a pedestrian H by not only the deployed air bag 21 but also a hood skin 11a elevated by the air bag 21 when the collision detection module detects the collision of pedestrian H.

The collision detection module, which includes an impulsive force sensor (not shown) and an accelerometer (not shown) which both detect the collision of a pedestrian H, is mounted to a bumper 13 of a vehicle body 1. When the collision detection module detects the impulsive force produced by the collision of pedestrian H, it sends a collision signal to an inflator 22 of an air bag unit 2 and a monitor 4. In this way, an apparatus for a vehicle for protection of a colliding object can instantaneously deploy the air bag 21 and project the image taken by the camera 3 on the monitor 4. This provides not only the protection for the pedestrian H but also a view for a driver.

What is claimed is:

1. An apparatus for a vehicle for protection of a colliding object comprising:
   one of a collision prediction module which delivers a precautionary signal when the collision prediction module predicts a collision of the vehicle with the object and an collision detection module which delivers a collision signal when the collision detection module detects the collision;
   an air bag which deploys on either a hood of the vehicle or an outside of a windshield thereof when the collision is either predicted by the collision prediction module or detected by the collision detection module;
   a camera for taking a forward image of the vehicle; and
   a monitor disposed in a cabin of the vehicle,
   wherein the monitor displays the image taken by the camera simultaneously with deployment of the air bag when the monitor receives one of the precautionary signal and the collision signal.

2. An apparatus according to claim 1 wherein the monitor comprises a head-up display unit which projects the image taken by the camera on the windshield.

3. An apparatus according to claim 1 wherein the collision prediction module employs image processing.

4. An apparatus according to claim 3 wherein one of an object sensor and an infrared camera is used for the image processing.

5. An apparatus according to claim 1 wherein the collision detection module comprises one of an impulsive force detector and an accelerometer.

6. An apparatus according to claim 1 wherein the camera comprises an infrared camera.

7. An apparatus according to claim 1 wherein the hood comprises a hood skin and a hood frame, an air bag storage space is defined between the hood skin and the hood frame, and the air bag is within the air bag storage space.

8. An apparatus according to claim 7 wherein the hood skin and hood frame are pivotally connected to each other and are separable from each other upon deployment of the air bag.

9. An apparatus for a vehicle for protection of a colliding object comprising:

one of a collision prediction module which delivers a precautionary signal when the collision prediction module predicts a collision of the vehicle with the object and an collision detection module which delivers a collision signal when the collision detection module detects the collision;

an air bag which deploys on an outside of a windshield of the vehicle when the collision is either predicted by the collision prediction module or detected by the collision detection module;

a hood skin which the deployed air bag elevates so that the hood skin can perform the protection of the colliding object in collaboration with the air bag;

a camera for taking a forward image of the vehicle; and a monitor disposed in a cabin of the vehicle, wherein the monitor displays the image taken by the camera simultaneously with deployment of the air bag when the monitor receives one of the precautionary signal and the collision signal.

10. An apparatus according to claim 9 wherein the vehicle includes a hood that includes the hood skin, and the hood further comprises a hood frame, an air bag storage space is defined between the hood skin and the hood frame, and the air bag is within the air bag storage space.

11. An apparatus according to claim 10 wherein the hood skin and hood frame are pivotally connected to each other, and the hood skin is separable from the hood frame in order to elevate upon deployment of the air bag.

* * * * *